(12) United States Patent
Arlt et al.

(10) Patent No.: US 6,464,097 B1
(45) Date of Patent: Oct. 15, 2002

(54) RESERVOIR CAP AND CAP ASSEMBLY METHOD

(75) Inventors: George E. Arlt; Rod Sanderson, both of Midland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/836,849

(22) Filed: Apr. 17, 2001

(51) Int. Cl.⁷ .................. B65D 39/10; B23P 11/02
(52) U.S. Cl. ............... 220/295; 220/304; 220/298; 29/450
(58) Field of Search ................ 220/293, 295, 220/296, 298, 300, 304, DIG. 32; 29/450

(56) References Cited

U.S. PATENT DOCUMENTS

| | | | | |
|---|---|---|---|---|
| 1,833,694 A | * | 11/1931 | Stant | 220/295 |
| 3,164,288 A | * | 1/1965 | Boomgaard | 220/DIG. 32 |
| 4,049,152 A | * | 9/1977 | Treanor | 220/295 |
| 4,081,102 A | * | 3/1978 | Sakai | 220/295 |
| 4,392,583 A | * | 7/1983 | Wong | 220/295 |
| 5,617,969 A | * | 4/1997 | Reichmann | 220/295 |

* cited by examiner

*Primary Examiner*—Nathan J. Newhouse
(74) *Attorney, Agent, or Firm*—Edmund P. Anderson

(57) ABSTRACT

The reservoir cap for a hydraulic fluid reservoir includes a cap plate and an integral stick, a gasket, a cup and a spring. The gasket is telescopically received on the stick and contacts a cap gasket surface on the cap plate. The cup has two radially extending ears with ramp contact surfaces and a central bore. The central bore has two spaced apart flat cup bore surfaces and cup projections that extend radially into the central bore. A coiled compression spring has one end in contact with the cup and another end in a spring retainer groove on the stick. The cup is mounted in a preliminary position on shelves on the stick. Rotation of the stick relative to the cup moves the cup off the shelves and the spring moves the cup to a working position.

6 Claims, 3 Drawing Sheets

RESERVOIR CAP AND CAP ASSEMBLY METHOD

TECHNICAL FIELD

The invention relates to a hydraulic fluid reservoir cap having a spring that applies a force to compress a seal between the cap and a reservoir filler neck and to the reduction of a initial cap mounting torque.

BACKGROUND OF THE INVENTION

Hydraulic fluid reservoirs have openings for checking the hydraulic fluid level and for adding hydraulic fluid. It is essential that the reservoir openings be closed to eliminate hydraulic fluid contamination. Contaminants can damage hydraulic system components such as pumps, valves and actuators. The sealing of reservoir openings is particularly important for reservoirs on vehicles, such as power steering reservoirs, due to their operating conditions. Such reservoirs are subjected to moisture, dust, abrasives, and various chemicals.

A hydraulic reservoir cap, that is currently used on automotive vehicle reservoirs, has a cap with a cap stick. A gasket is telescopically received on the cap stick. A cup member with a pair of radially extending ears, is telescopically and non-rotatably received on the cap stick. A coiled compression spring has one end seated on the cup member and the other end seated on a ledge on the cap stick so that the compression spring urges the cup toward the gasket. When the reservoir cap is mounted on a reservoir opening neck, in a closed position, the cup ears contact an interior ramp surface on the reservoir opening neck, the gasket contacts an exterior surface of the reservoir opening neck and the gasket is compressed between the reservoir opening neck and the gasket seat on the cap stick by the compression spring. As the gasket wears the compression spring maintains a seal. The reservoir cap is rotated about 125° in one direction to close the reservoir opening neck and in the opposite direction to open the reservoir opening neck. A torque of about 2.3 Nm is required to rotate the reservior cap to a closed position or to an open position. Most individuals can easily rotate the closure cap to an open or to a close position without difficulty.

During assembly of hydraulic reservoirs, and prior to shipment to vehicle assembly lines, a reservoir cap is placed on a hydraulic reservoir and rotated to a closed position to keep contaminants out of the reservoir. A person that installs several thousand of the reservoir caps on the reservoirs during an eight-hour shift will likely find a torque of about 2.3 Nm tiring.

A tool which provides leverage and reduces the force required to rotate a closure cap to a closed position has been tried. Such a tool reduces the force required to produce a torque of 2.3 Nm and reduces the chance of a repetitive stress injury. Unfortunately the tool substantially increases the time required to install a reservoir cap. The increased time required to install a reservoir cap using a tool substantially reduces the number of reservoir caps that can be installed in eight hours and increases the cost of each of reservoir produced.

SUMMARY OF THE INVENTION

The reservoir cap for a fluid reservoir includes a cap plate having a cap gasket surface. A cap stick has a base portion that is integral with the cap plate. The cap stick has a stick axis that is perpendicular to the cap gasket surface. A primary flat surface on the cap stick is parallel to the stick axis and extends axially away from the cap gasket surface. A shelf on the cap stick is axially spaced from and parallel with the cap gasket surface. A gasket is telescopically received on the cap stick and in contact with the cap gasket surface. A cup has two radially extending ears and a central bore with a flat cup bore surface. The central bore telescopically receives the cap stick. A spring is in engagement with the cup and the cap stick and urges the cup toward the cap gasket surface. The cup is rotatable relative to the cap stick into engagement with the shelf to hold the cup in a preliminary position. The cup is rotatable out of engagement with the shelf to free the cup to be moved toward the cap gasket surface and into a working position by the spring.

BRIEF DESCRIPTION OF THE DRAWINGS

Presently preferred embodiments of the invention are disclosed in the following description and in the accompanying drawings, wherein.

DETAILED DESCRIPTION OF PREFERRED EMBODIMENT

Figure 1:
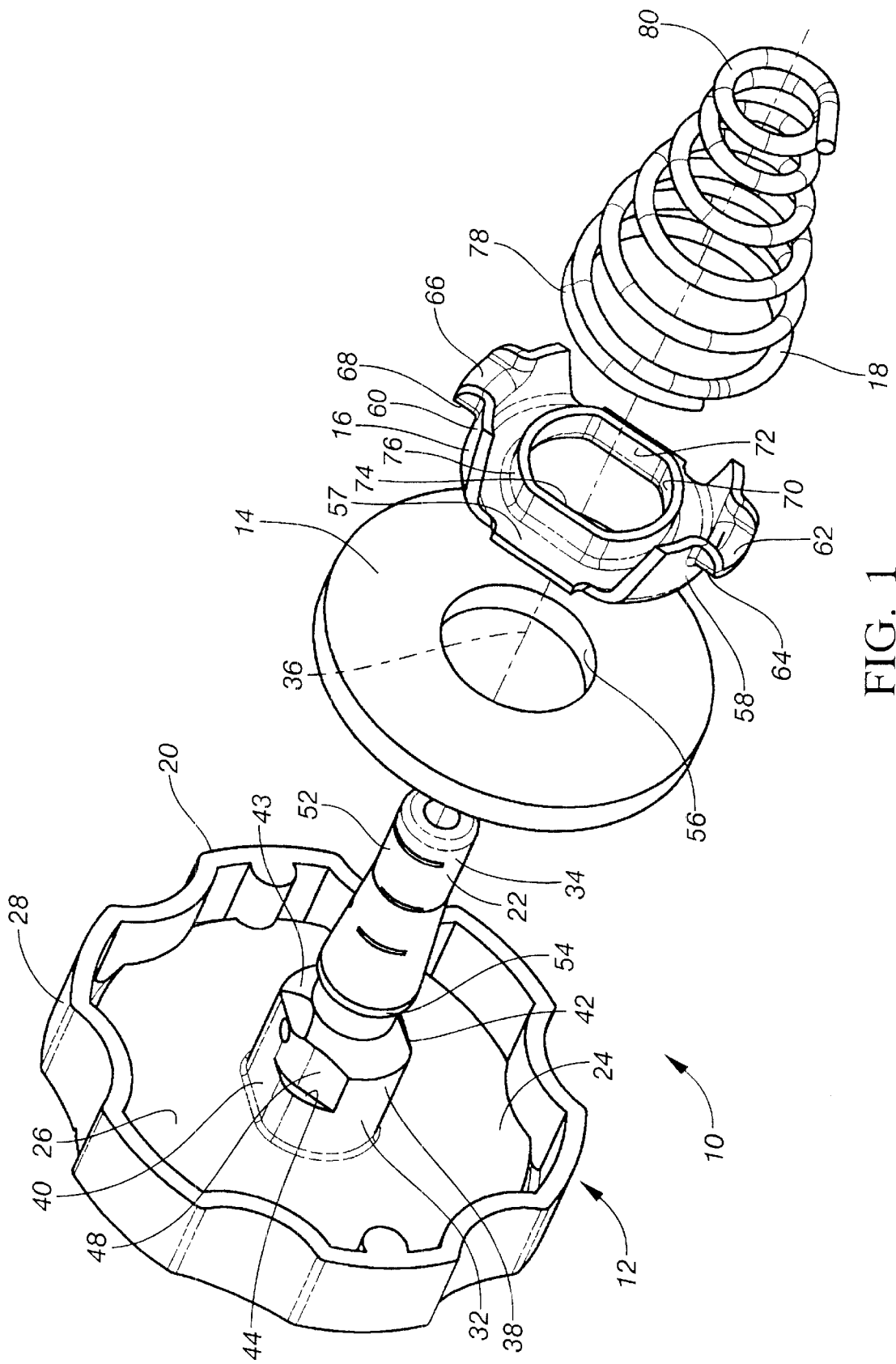
FIG. 1 is an expanded perspective view of the reservoir cap.
Figure 2:
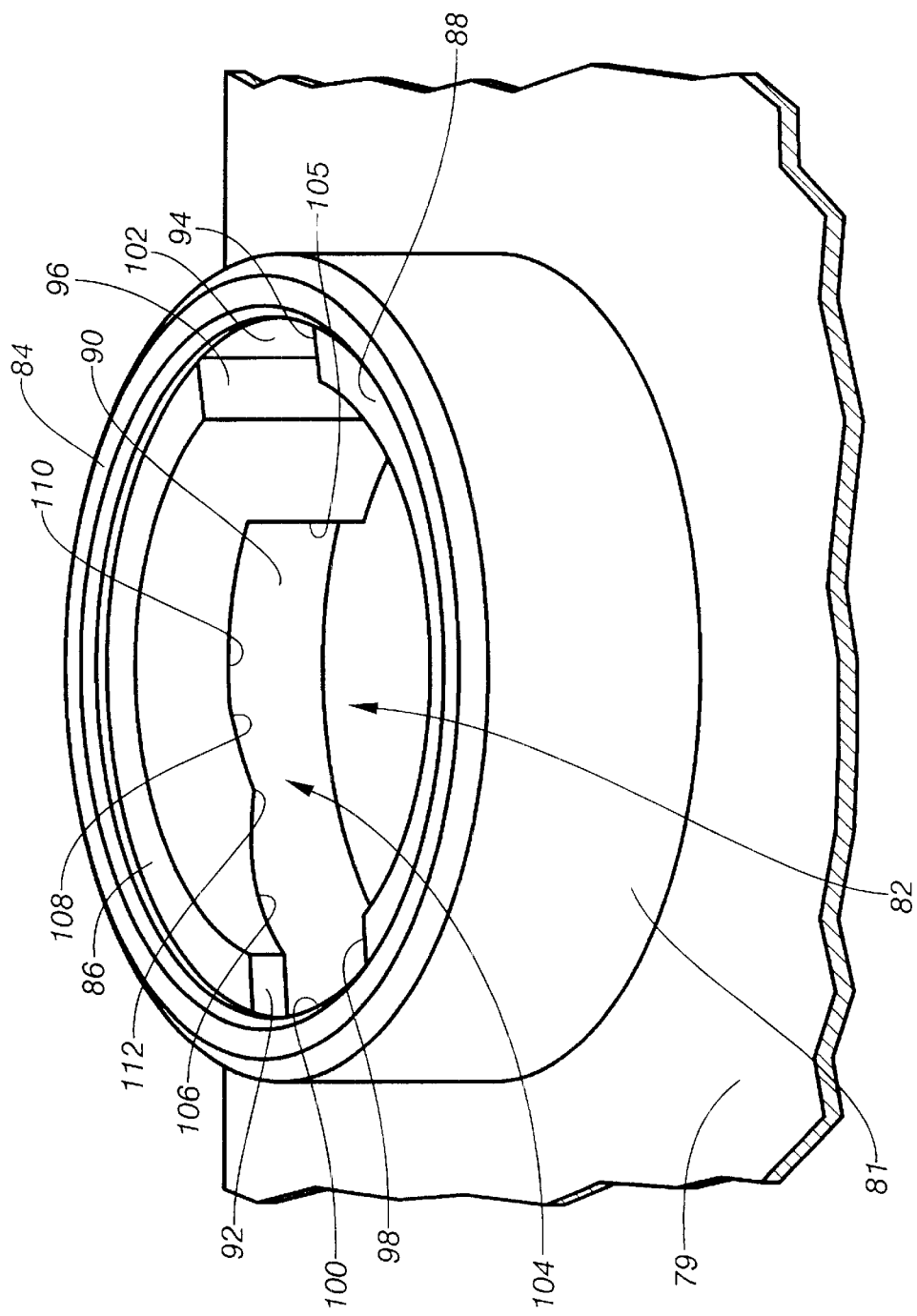
FIG. 2 is a perspective view of a hydraulic fluid reservoir neck.
Figure 3A:
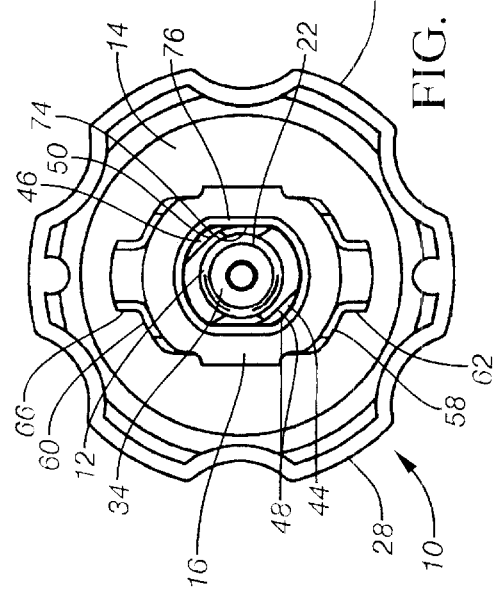
FIG. 3A is a bottom view of the reservoir cap with the cup in a preliminary position on the shelf.
Figure 4A:
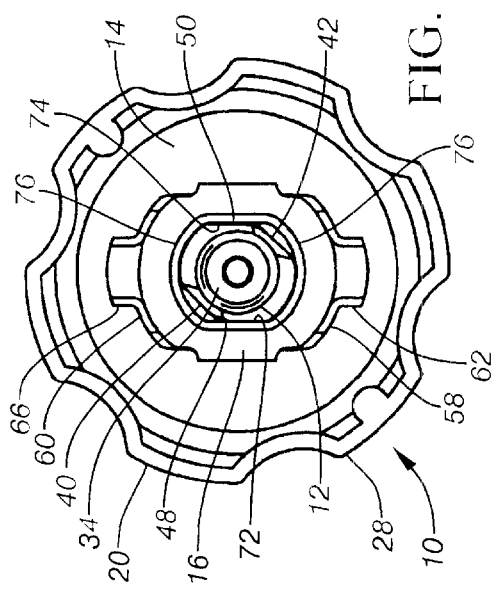
FIG. 4A is a bottom view of the reservoir cap with the cup in a working position.
Figure 3B:
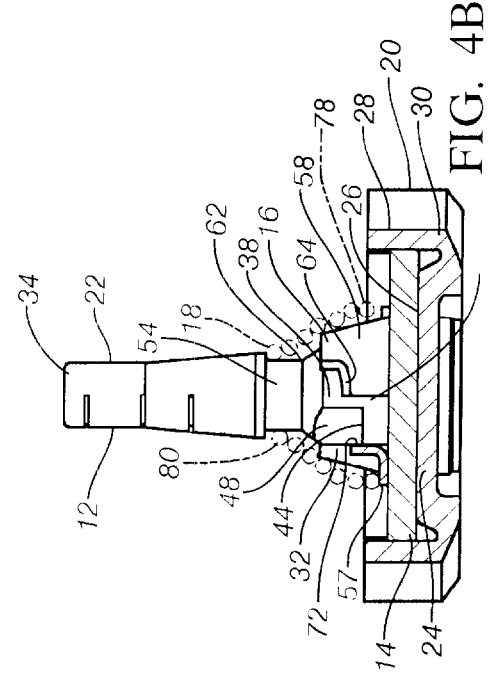
FIG. 3B is a sectional view taken along line 3—3 in FIG. 3A with parts broken away.
Figure 4B:
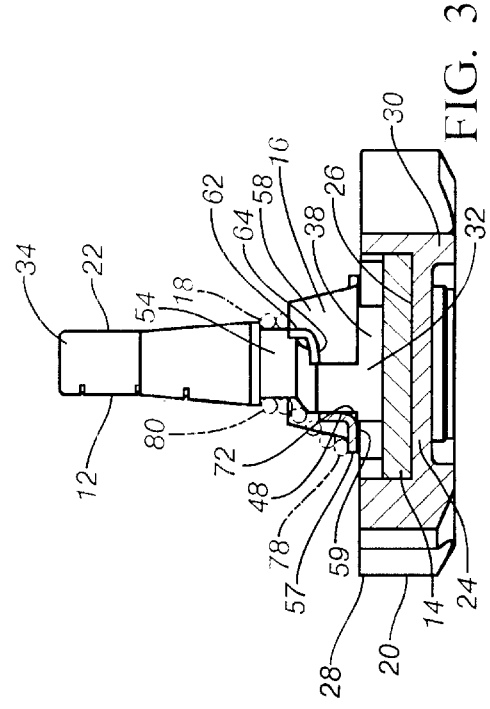
FIG. 4B is a sectional view taken along line 4—4 in FIG. 4A with parts broken away.

The reservoir cap 10 includes a cap stick 12, a gasket 14, a cup 16 and a spring 18. The cap stick 12 includes a cap 20 and an integral stick 22. The cap 20 has a cap plate 24 with a cap gasket surface 26. The cap plate 24 has a gripping flange 28 on its periphery 30 that extends axially downward from the cap plate.

The stick 22 has a base 32 that is integral with the cap plate 24. The stick 22 also has a free end 34. The entire stick 22 as well as the cap 20 is symmetrical about a stick axis 36. The base 32 is a cylindrical member 38 with two primary flat surfaces 40 and 42. The primary surfaces 40 and 42 are spaced apart and parallel to each other and to the stick axis 36. Both primary surfaces 40 and 42 extend axially downward from the cap plate 24 to the base end 43. Shelves 44 and 46 on the base 32 are parallel to and spaced from the cap gasket surface 26. Secondary flat surfaces 48 and 50 each extend downwardly from one of the shelves 40 and 46. The secondary flat surfaces 48 and 50 are parallel to each other and to the axis 36. The secondary flat surfaces 48 and 50 are spaced apart a distance that is equal to the distance between the primary flat surfaces 40 and 42. The primary flat surface 40 is intersected by the secondary flat surface 48. The primary flat surface 42 is intersected by the secondary flat surface 50. The free end 34 of the stick 22 includes a truncated conical portion 52 and a spring retainer groove 54. The gasket 14 is a compressible material with a center bore 56. The diameter of the center bore 56 is substantially the same as the diameter of the cylindrical member 38 of the stick 22.

The cup 16 has a plate portion 57 with outer skirts 58 and 60. A radially extending ear 62 on the outer skirt 58 has a ramp contact surface 64. A radially extending ear 66 on the skirt 60 has a ramp contact surface 68. A center passage 70 through the cup 16 is generally cylindrical with two flat cup bore surfaces 72 and 74. An axial flange 76 surrounds the center passage 70 and reinforces the cup 16.

The spring 18 is a coiled compression spring. The upper end 78 of the spring 18 engage the plate portion 57 of the cup 16 and is radially positioned between the axial flange 76 and the skirts 58 and 60. The lower end 80 of the spring 18 is a small diameter coil that is received in the spring retainer groove 54 of the cap stick 12. During assembly the diameter of the small diameter coil on the lower end 80 is increased as the spring, 18 is forced over the conical portion 52 of the stick 22. After the lower end 80 of the spring 18 passes over the conical portion 52, it contracts into the retainer groove 54.

The hydraulic fluid reservoir 79 has a cylindrical neck 81 with a filler opening 82. A sealing surface 84 is provided on the outer end of the neck 81. Two cap holders 86 and 88 are fixed to the inside cylindrical surface 90 of the neck 81. Both cap holders 86 and 88 are identical. An inlet end 92 of the cap holder 86 is spaced 180° from the inlet end 94 of the cap holder 88. Block ends 96 and 98 of the cap holders 86 and 88 are spaced from the inlet ends 92 and 94 of the adjacent cap holder. The spaces between the block ends 96 and 98 and the inlet ends 92 and 94 provide axial cap ear passages 100 and 102.

Both cap holders 86 and 88 have ramp surfaces 104 that extend from their inlet ends 92 and 94 to cup ear stop surfaces 105 adjacent to their block ends 96 and 98. Only the ramp surfaces 104 and the cap ear stop surfaces 105 on the cap holder 86 are shown in the drawing. The cup ear stop surface 105 is a flat radial surface that is spaced from and faces away from the flat radial surface on the block end 96 or 98.

The ramp surface 104 on the cup holder 86 includes an inlet ramp 106, a retainer ramp 108 and a holder ramp 110. The inlet ramp 106 extends axially away from the sealing surface 84 from the inlet end 94 to the ramp bottom 112. The retainer ramp 108 intersects the inlet ramp 106 and extends axially upward from the ramp bottom 112 to the holder ramp 110. The holder ramp 110 is in a plane that is parallel to the sealing surface 84.

During normal use of the hydraulic fluid reservoir 79, the reservoir is closed by moving the radially extending ears 62 and 66 on the reservoir cap 10 axially into the cap ear passages 100 and 102 until the gasket 14 contacts the sealing surface 84. The reservoir cap 10 is then rotated in a clockwise direction, as viewed from above, to move the ramp contact surfaces 64 and 68 into contact with the inlet ramps 106. Continued clockwise rotation of the reservoir cap 10 moves the cup 16 off the gasket 14 and shortens the axial length of the spring 18 until the radially extending ears 62 and 66 move past the ramp bottoms 112. Continued clockwise rotation of the reservoir cap 10 moves the ears 62 and 66 up the retainer ramps 108 and onto the holder ramps 110. The stop surfaces 105 limit clockwise movement of the reservoir cap 10. The retainer ramps 108 permit the spring 18 to expand slightly but still compress the gasket 14 between the cap gasket surface 26 and the sealing surface 84 and maintains a satisfactory seal.

The reservoir 79 is opened by rotating the reservoir cap 10 counterclockwise. Counterclockwise rotation moves the radially extending ears 62 and 66 off the holder ramp 110, down the retainer ramp 108, over the ramp bottom 112 and up the inlet ramp 106 to the ear passages 100 and 102. After the block ends 96 and 98 stop counterclockwise rotation of the reservoir cap 10, the cap is moved axially away from the cylindrical neck 81 and the reservoir 79. The torque required to rotate the reservoir cap counterclockwise down the retainer ramps 108 and over the ramp bottom 112 is about the same as the torque required to rotate the cap clockwise down the inlet ramp 106 and over the ramp bottoms 112. This torque, as set forth above, is acceptable for checking and adding hydraulic fluid. However, it may be excessive on an assembly line where several thousand caps 10 are manually rotated to a closed position during each eight-hour shift.

During assembly of the reservoir cap 10 in the factory, the gasket 14 is positioned on the base 32 of the stick 22 and in contact with the cap gasket surface 26. The cup 16 is then placed on the stick 22 with shelf engaging surfaces 59 on the plate portion 57 setting on the shelves 44 and 46. The spring 18 is then mounted on the stick 22 with the upper end 78 in engagement with the cup 16 and the lower end 80 in the spring retainer groove 54. In this position the spring 18 is compressed into a shortened position. Friction resists rotation between the cup 14 and the cap stick 12 and keeps the cup; 16 on the shelves 44 and 46. The reservoir cap 10 is then inserted axially into the cylindrical neck 81 until the gasket 14 contact the sealing surface 84 and the cap gasket surface 26. The cap 10 is then rotated clockwise as viewed from above. The radially extending ears 62 and 66 do not contact the ramp surfaces 104 because the axial distance between the shelves 44 and 46 and the cap gasket surface 26 exceeds the thickness of the gasket 14 plus the axial distance from the ramp bottoms 112 to the sealing surface 84. Continued clockwise rotation of the cap stick 12, after the radially extending ears 62 and 66 contact the cup ear stop surfaces 105, rotates the cap stick 12 relative to the cup 16 and moves the cup off the shelves 44 and 46. Once the cup 16 is off the shelves 44 and 46, the spring 18 expands, moves the ears 62 and 66 into contact with the holder ramps 110, and moves the entire cup toward the cup gasket surface 26. This movement of the cup 16 compresses the gasket 14 between the cup gasket surface 26 and the sealing surface 84 on the neck 81. The torque required to rotate the reservoir cap 10 when the cup 16 is on the shelves 44 and 46 and to release the cup from the shelves, as explained above, is minimal. A person can perform the operation to close the filler cap opening 82 and release the cup 16 from the shelves 44 and 46 thousands of times per day without excessive stress.

The disclosed embodiments are representative of presently preferred forms of the invention, but are intended to be illustrative rather than definitive thereof. The invention is defined in the claims.

What is claimed is:

1. A reservoir cap assembly for a fluid reservoir comprising:
  a cap having a cap gasket surface;
  a stick extending from said cap along a stick axis transverse to said cap gasket surface;
  a shelf provided on said stick in axially spaced relation to said cap gasket surface;
  a gasket disposed about said stick in contact with said cap gasket surface;
  a cup having radially extending mounting ears and a center passage through which said stick extends and a shelf engaging surface;
  a spring urging said cup toward said cap gasket surface; and
    wherein said cup is supported on said stick for axial and rotational movement between a preliminary position in which the shelf engaging surface is in contact with the shelf and the spring applies force to the shelf and a working position in which the spring applies force to the gasket.

2. A reservoir cap for a fluid reservoir as set forth in claim 1 including a surface on said stick that is parallel to the primary flat surface and that is parallel to the stick axis and prevents rotation of said cup relative to said stick when said cup is in the working position.

3. A reservoir cap for a fluid reservoir as set forth in claim 2 including a second shelf on said stick and a second shelf engaging surface on said cup.

4. A reservoir cap for a fluid reservoir as set forth in claim 1 wherein the spring is a coiled compression spring.

5. A reservoir cap for a hydraulic fluid reservoir comprising:

a cap plate with a cap gasket surface;

a cap stick with a base portion integral with the cap plate having a stick axis that is perpendicular to the cap gasket surface and has a pair of primary flat surfaces that are spaced apart and parallel to each other and to the stick axis and extend axially away from the cap gasket surface;

a pair of shelves on the cap stick that are axially spaced from and parallel with the cap gasket surface;

a pair or secondary flat surfaces on the stick that are spaced apart and parallel to each other and to the stick axis, wherein each of the two secondary flat surfaces start at one of the pair of shelves and extends away from the pair of shelves and the cap gasket surface, and wherein each of the secondary flat surfaces intersect one of the pair of primary flat surfaces;

a gasket that is telescopically received on the stick and contacts the cap gasket surface;

a cup having two radially extending ears with ramp contact surfaces, with a pair of parallel spaced apart flat cup bore surfaces that telescopically receives the stick;

a coil spring with an upper end that engages the cup and a lower end that contacts a spring retainer on the stick; and wherein the cup is urged into contact with the pair of shelves on the cap stick when the stick is rotated to a preliminary position relative to the cup and wherein the rotation of the stick relative to the cup to a working position frees the cup to move off the pair of shelves and toward the gasket.

6. A reservoir cap assembly method comprising:

mounting a gasket on a cap stick with the gasket in contact with a cap gasket surface and with a stick of the cap stick passing through a bore through the gasket;

mounting a cup on at least one shelf on the stick;

mounting a spring on the stick to exert a force on the cup that urges the cup toward the gasket;

inserting the stick in a reservoir;

rotating said reservoir cap assembly to a closed position; and rotating the cap stick relative to the cup to move the cup off the at least one shelf and free the cup to move toward the gasket.

* * * * *